US007731927B2

(12) United States Patent
Sugimoto et al.

(10) Patent No.: US 7,731,927 B2
(45) Date of Patent: Jun. 8, 2010

(54) CERAMIC NANOWIRES AND A PROCESS FOR PRODUCING THEM BY ION BEAM IRRADIATION

(75) Inventors: Masaki Sugimoto, Takasaki (JP); Masahito Yoshikawa, Takasaki (JP); Shuhei Seki, Suita (JP); Satoshi Tsukuda, Suita (JP); Seiichi Tagawa, Suita (JP)

(73) Assignee: Japan Atomic Energy Research Institute, Ibaraki (JP)

( * ) Notice: Subject to any disclaimer, the term of this patent is extended or adjusted under 35 U.S.C. 154(b) by 854 days.

(21) Appl. No.: 11/520,677

(22) Filed: Sep. 14, 2006

(65) Prior Publication Data

US 2010/0111805 A1    May 6, 2010

(30) Foreign Application Priority Data

Sep. 16, 2005   (JP)   ............................. 2005-269602

(51) Int. Cl.
  *B82B 3/00*   (2006.01)
  *C01B 21/068*   (2006.01)
(52) U.S. Cl. ........................ 423/344; 427/492; 427/493; 427/503; 427/903; 977/892
(58) Field of Classification Search ................. 423/345, 423/344; 427/492, 493, 503, 903; 977/892
See application file for complete search history.

(56) References Cited

OTHER PUBLICATIONS

Meng, et al., β-SiC Nanorods With Uniform Amorphous SiO2 Wrappers On The Outside Surface, Materials Research Bulletin 1999; 34(5): 783-790.*
Gundiah, et al., Synthesis and characterization of silicon carbide, silicon oxynitride and silicon nitride nanowires, Journal of Materials Chemistry 2002; 12: 1606-1611.*
Seki, et al., 3-D Structure Control of Nanowires Formed by Single Ion Hitting to Si-Based Polymers, Nippon Genshiryoku Kenkyujo Jaeri, Review pp. 147-149 (2003).*
Shu Seki, et al., "Formation of Nanowires along Ion Trajectories in Si Backbone Polymers", Advanced Materials, Nov. 16, 2001, pp. 1663-1665, vol. 13, No. 22.
G.W. Meng, et al., "62 -SiC Nanorods with Uniform Amorphous SiO$_2$ Wrappers on the Outside Surface", Materials Research Bulletin, 1999, pp. 783-790, vol. 34, No. 5.
T. Taguchi, et al., "Synthesis of Silicon Carbide Nanotubes", J. Am. Ceram. Soc., 2005, pp. 459-461, vol. 88, No. 2.

* cited by examiner

*Primary Examiner*—Stuart Hendrickson

(57) ABSTRACT

A method by which ceramic nanowires with diameters ranging from several to several tens of nanometers can be synthesized with improvements in the shape retention of the nanowires and the yield of conversion to ceramic, which method comprises the steps of forming a thin film of a silicon-containing polymer usable as a ceramic precursor, irradiating the thin film with ion beams to form cylindrical crosslinked portions, extracting the un-crosslinked portions with a solvent to produce nanowires of the silicon-containing polymer, irradiating the nanowires with an ionizing radiation so that they are crosslinked again, and firing the re-crosslinked nanowires.

13 Claims, 3 Drawing Sheets

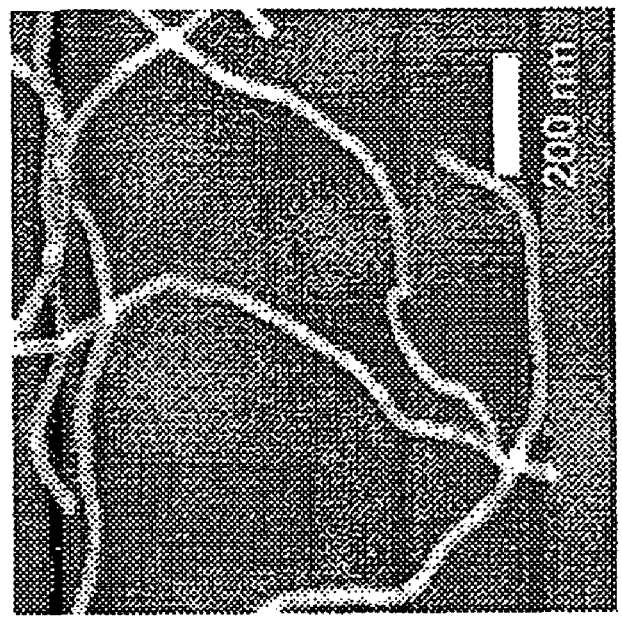
Fig. 3
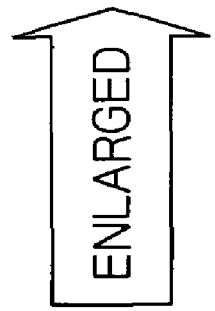
ENLARGED
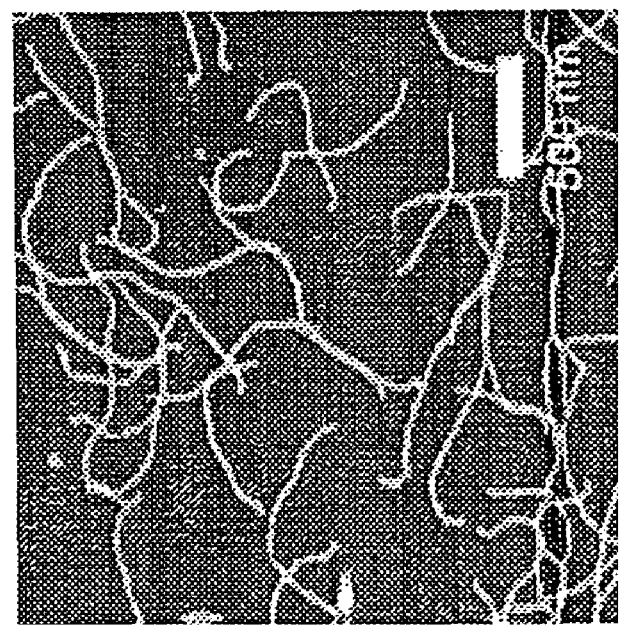

CERAMIC NANOWIRES AND A PROCESS FOR PRODUCING THEM BY ION BEAM IRRADIATION

BACKGROUND OF THE INVENTION

1. Field of the Invention

The present invention relates to ceramic nanowires with diameters ranging from several to several tens of nanometers and a process for producing such ceramic nanowires.

2. Prior Art

Silicon carbide fibers undergo only small changes in tensile strength and elastic modulus even if they are heated at 1500° C. They are also much better than carbon fibers in oxidation resistance and in addition they are extremely low in reactivity with metals. Hence, silicon carbide fibers are drawing attention as heat- and corrosion-resistant materials, a typical example of which is a reinforcing material to be used in metal-based composites. Such silicon carbide fibers are synthesized by chemical vapor deposition (CVD) or pyrolysis of silicon-containing polymers (the latter being called the "precursor method").

The CVD process consists of causing a core wire of carbon or tungsten to react with a feed gas of SiC at high temperature so that the latter is deposited on the wire's surface. Silicon carbide fibers produced by this method have high purity and excel in mechanical characteristics and the like; however, their diameter is very thick, on the order of 100 µm, so difficulty has been involved in working them in such a way that they are suitable for use as a reinforcing material in composites.

Being developed by Yajima et al. in 1975, the precursor method is now an industrial process in which the silicon-containing polymer polycarbosilane (PCS) as the starting material is melt spun, then cured and fired. The intermediate step is important in that the molecules in the melt spun polymer fibers are crosslinked with themselves so that they can be converted to ceramic while retaining the fiber's shape. Two commercialized processes of the precursor method are thermal oxidation in which the silicon-containing polymer is heated in an oxidizing atmosphere so that it is crosslinked via oxygen atoms, and EB irradiation in which the silicon-containing polymer is directly crosslinked by irradiation of electron beams. By means of these techniques, various silicon carbide fibers are already commercially available and they include NICALON® and HI-NICALON®.

The fibers produced by the precursor method are in filamentous form having diameters of 10-15 µm. Active efforts are being made today to develop small shaped ceramics for use in micromachines, as well as nanodevices that take advantage of the heat- and corrosion-resistant properties of SiC. In order that the fibers produced by the precursor method are applied as reinforcing fibers in those small shaped ceramics or nanodevices materials, even finer ceramic fibers are needed. Conventional techniques for synthesizing such ultrafine fibers include a focused ion beam (FIB) method that employs a focused ion beam to perform micro-cutting, and a trimming method that depends on photolithography. However, nanowires, or fibers with diameters on the order of nanometers cannot be formed by those methods. Other synthesis methods known in the art include a process in which fine particles of a silicon-containing polymer are dispersed in a thermally degradable polymer, drawn, and fired into ceramic, and a process in which a carbon nanotube is converted into ceramic. However, it is difficult to control the fiber length and thickness to desired values by those processes.

A study of the present inventors has led to a technique of synthesizing nanowires from silicon-containing polymers by means of ion beams (see *Formation of Nanowires along Ion Trajectories in Si Backbone Polymers*, S. Seki, K. Maeda, S. Tagawa, H. Kudoh, M. Sugimoto, Y. Morita, and H. Shibata, *Adv. Mater.* 13(2001), 1663-1665). The principle of the technique is shown in FIG. 1. When a thin film formed of the silicon-containing polymer polysilane is irradiated with an ion beam, sufficient energy is deposited on the silicon-containing polymer (e.g. polysilane) along the trajectories of the individual ions penetrating the thin film, whereupon the molecular chains near the trajectories are first cleaved, then recombined (crosslinked). The points of recombination (crosslinking points) are distributed along the trajectory of the ion beam and their density decreases with the radial distance from the center of trajectory. As shown in FIG. 1, this causes a cylindrical crosslinked portion to form in the thin film of the silicon-containing polymer along the ion beam trajectory. By subsequent washing in a solvent that is capable of dissolving the silicon-containing polymer, all part of the polymer film except the cylindrical crosslinked portion is dissolved away by the action of the solvent, thus producing a cylindrical crosslinked nanowire. Taking advantage of this nature, the present inventors set out to study a new method for producing ceramic nanowires.

SUMMARY OF THE INVENTION

An object of the present invention is to provide a simple method by which a silicon-containing polymer as a ceramic precursor is shaped in a thin film and irradiated with ion beams to form cylindrical crosslinked portions, which are then fired to produce uniform ceramic nanowires in a controlled quantity, thickness and length with diameters ranging from several to several tens of nanometers.

The present inventors took advantage of the fact that when a silicon-containing polymer which was a precursor polymer for silicon carbide ceramics was irradiated with ion beams, cylindrical portions of the polymer with diameters ranging from several to several tens of nanometers were crosslinked to become insoluble in a solvent. When the resulting crosslinked cylindrical portions of the polymer were fired, they could be converted to ceramic fibers, or nanowires having diameters on the order of nanometers. The present invention has been accomplished on the basis of this finding.

According to one aspect of the present invention, it provides a method for synthesizing ceramic nanowires with diameters ranging from several to several tens of nanometers which comprises the steps of forming a thin film of a silicon-containing polymer usable as a ceramic precursor, irradiating the thin film with ion beams to form cylindrical crosslinked portions, extracting the crosslinked portions with a solvent, and firing the extracted crosslinked portions in an inert gas.

According to another aspect of the present invention, it provides a method by which ceramic nanowires with diameters ranging from several to several tens of nanometers can be synthesized with improvements in the shape retention of the nanowires and the yield of conversion to ceramic, which method comprises the steps of forming a thin film of a silicon-containing polymer usable as a ceramic precursor, irradiating the thin film with ion beams to form cylindrical crosslinked portions, extracting the crosslinked portions with a solvent to produce nanowires of the silicon-containing polymer, irradiating the nanowires with an ionizing radiation so that they are crosslinked again, and firing the re-crosslinked nanowires.

BRIEF DESCRIPTION OF THE DRAWINGS

FIG. 3 shows by scanning probe micrographs those ceramic nanowires which were produced according to the present invention.

DETAILED DESCRIPTION OF THE INVENTION

Silicon-containing polymers such as polycarbosilane (PCS) and polymer blends of PCS with polyvinylsilane (PVS) can be converted to ceramic by firing to 1000° C. or above in an inert gas; their melting points are between 200 and 250° C.; and they are soluble in various organic solvents including tetrahydrofuran, toluene, benzene, cyclohexane, normal hexane, and xylene.

When these silicon-containing polymers are irradiated with an ionizing radiation, part of their molecules are cleaved and then recombined in a network to produce a crosslinked structure. The resulting crosslinked portion will not melt even if it is heated to a temperature above the melting point of the original polymer, and it also becomes insoluble in any of the organic solvents mentioned above.

Figure 1:
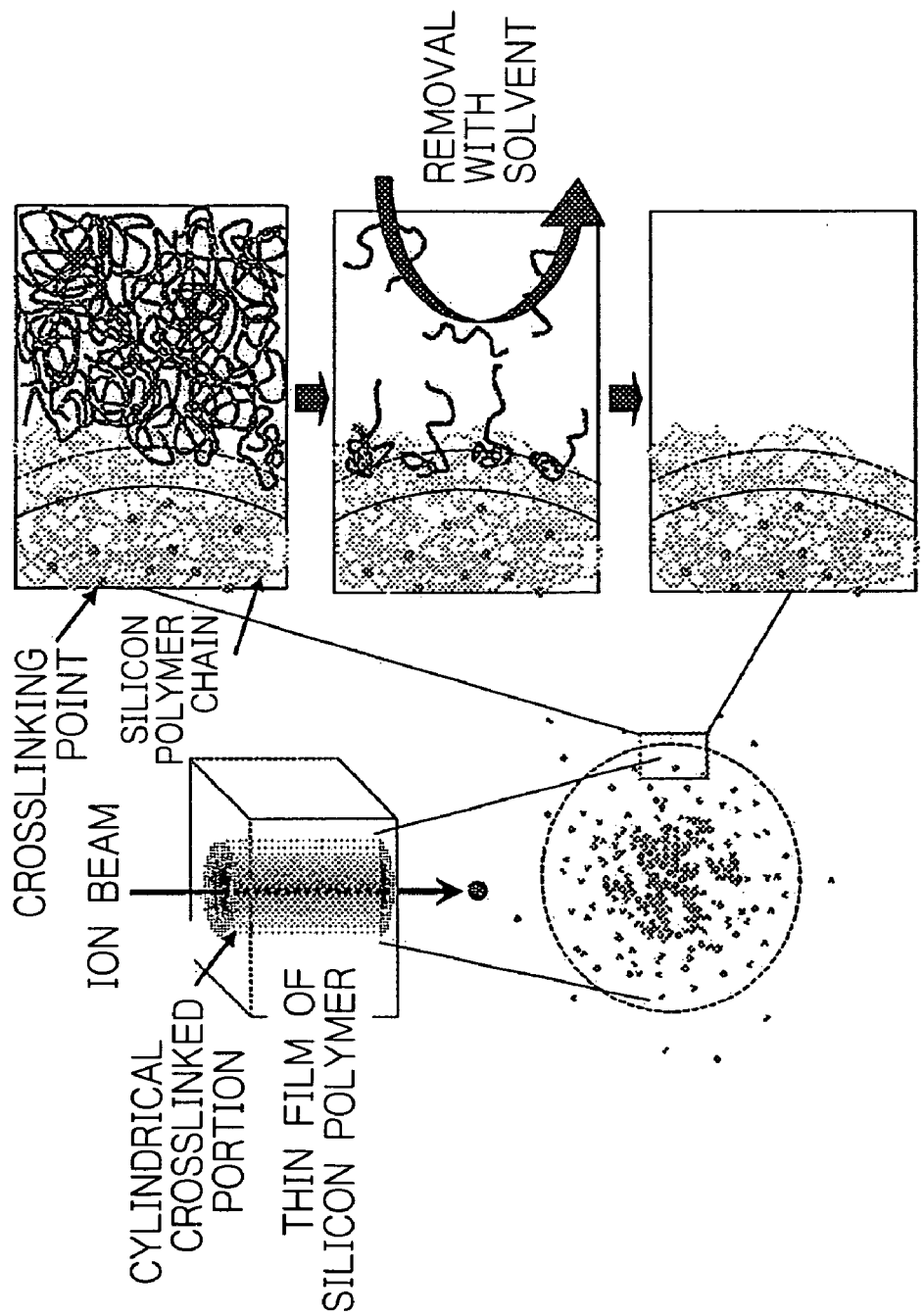
FIG. 1 depicts the mechanism of crosslinking in a silicon-containing polymer by irradiation with an ion beam.

When a thin film of silicon-containing polymer is irradiated with ion beams, the individual incident ions deposit high density of energy along their trajectories to form cylinders of crosslinked portion, as already shown in FIG. 1. The radius of the cylindrical crosslinked portions depends on the range over which energy is deposited along the ion trajectories, the size of the molecules that are fixed by crosslinking, and the ease with which crosslinks are generated from the same amount of energy deposition. Therefore, the radius of the cylindrical crosslinked portions can be controlled by linear energy transfer (LET) to the polymer along the ion trajectories, the molecular weight of the polymer, and the reactivity of the polymer to the radiation. In addition, since the ion beam penetrates the thin film almost linearly, the length of the cylindrical crosslinked portions is the same as the film thickness. Therefore, the length of the cylindrical crosslinked portions which are formed by washing off the uncrosslinked portion with one of the solvents mentioned above can be controlled by changing the thickness of the thin film of the silicon-containing polymer, and the number of cylindrical crosslinked portions that are generated per unit area can be controlled by changing the amount of ion irradiation.

In order to convert the silicon-containing polymer such as polycarbosilane to ceramic by firing its cylindrical crosslinked structure at a temperature higher than its melting point as it retains its shape, it must be rendered to be infusible, or brought to a state where it does not melt even if it is heated to a temperature above its melting point. In the process of conversion to ceramic, an insufficiently crosslinked portion is decomposed away so that the yield of conversion to ceramic will decrease. In order to ensure efficient conversion from the crosslinked silicon-containing polymer to ceramic, the cylindrical crosslinked portion needs to have crosslinks introduced fully not only in the central port but also in its periphery. The cylindrical crosslinked portion that has been formed by irradiation with an ion beam satisfies this condition in the neighborhood of the center into which the ions have been injected; on the other hand, the periphery of the cylindrical crosslinked portion has such a small degree of crosslinking that the yield of conversion to ceramic will decrease to cause potential deformation. In order to remove this possibility, the cylindrical crosslinked portion that remains after removing the uncrosslinked portion by solvent treatment is desirably irradiated with an ionizing radiation so that the cylindrical crosslinked portion undergoes uniform and sufficient crosslinking throughout, whereby it becomes possible to perform firing with improvements in the shape retention and the yield of conversion to ceramic.

BEST MODE FOR CARRYING OUT THE INVENTION

Figure 2:
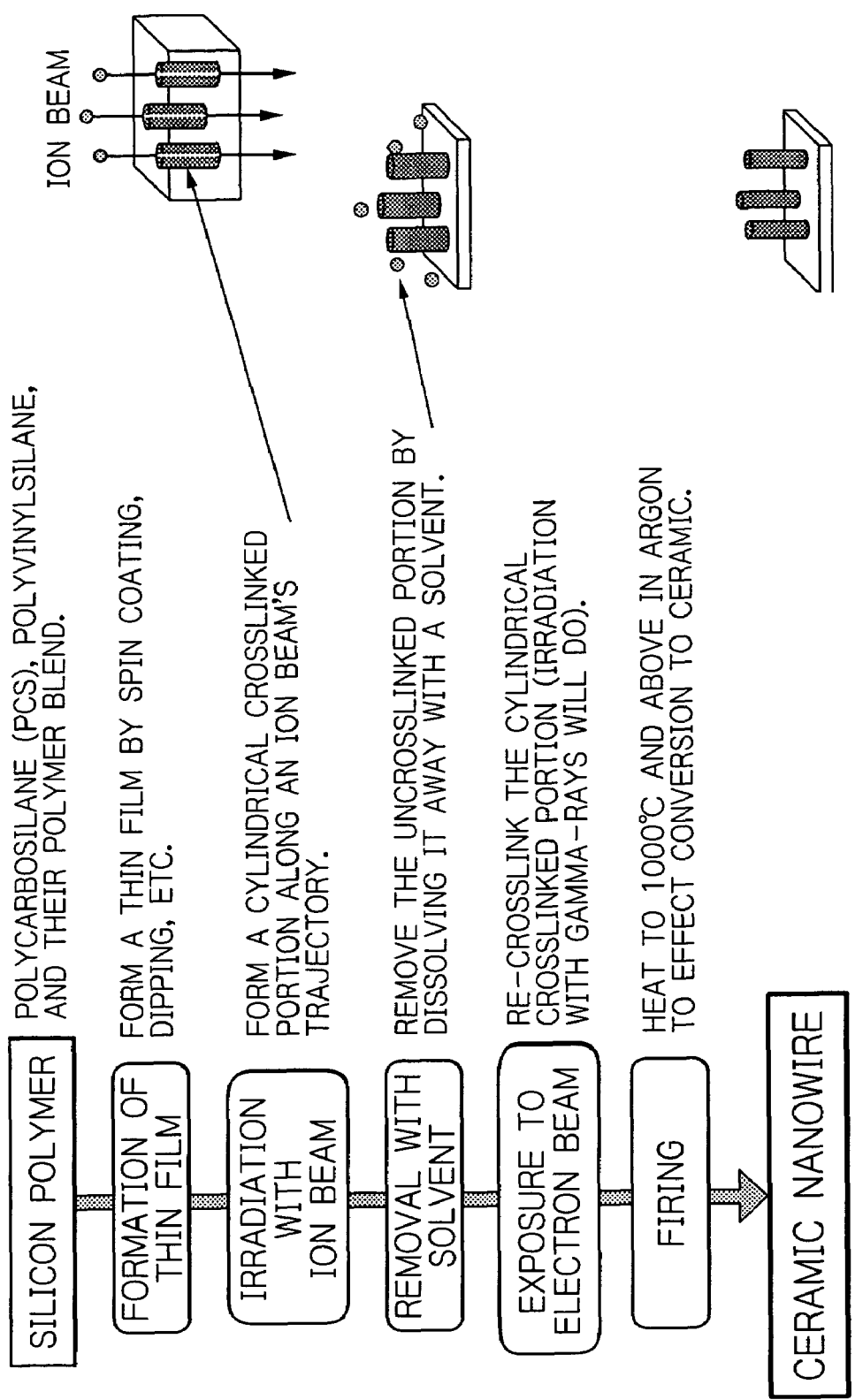
FIG. 2 shows schematically a sequence of steps in the process of producing ceramic nanowires according to the present invention.

FIG. 2 shows a sequence of steps in the process of producing nanowires according to the present invention. A thin film of silicon-containing polymer is formed on a heat-resistant smooth substrate by a suitable method such as spin coating or dipping. In order to ensure that nanowires prepared by the technique described hereinabove are each fixed at an end, the ion beams applied must penetrate the thin film to reach the substrate. To this end, the thickness of the thin film is controlled to be shorter than the range of the ion beams in the silicon-containing polymer. After irradiating the thin film of silicon-containing polymer with ion beams so that cylindrical crosslinked portions are formed in the thin film along the trajectories of the individual ions, the uncrosslinked portion of the thin film that has not been irradiated by the ion beams is dissolved away by solvent treatment. Solvents that can be used are those in which the silicon-containing polymer is soluble and they include tetrahydrofuran, toluene, benzene, cyclohexane, normal hexane, and xylene.

In the next step, the cylindrical crosslinked portions thus obtained may be directly converted to ceramic. However, in order to improve the shape retention of the nanowire and the yield of conversion to ceramic, the cylindrical crosslinked portions are irradiated by electron beams so that they are crosslinked again. Instead of electron beams, any radiation that has an ionizing action may be employed and an example is gamma-rays. In the last step, the cylindrical crosslinked portions are fired up to a temperature of 1000° C. or above in an inert gas atmosphere such as argon gas, whereby the silicon-containing polymer is converted to a silicon carbide ceramic in the form of nanowires. If desired, firing may be performed in an ammonia atmosphere to produce silicon nitride nanowires.

The following example is given to illustrate the present invention in a more specific manner.

Example

The organic silicon-containing polymer polycarbosilane (PCS) or a polymer blend consisting of PCS and 20% polyvinylsilane (PVS) was dissolved in the solvent toluene to form a 5 wt % solution. A silicon wafer as a smooth substrate was spin coated with the polymer solution to form a thin film of silicon-containing polymer in a thickness between 100 and 1000 nm. The substrate having the thin film of silicon-containing polymer was set up in a vacuum chamber and irradiated with ion beams from a cyclotron as they were scanned uniformly, whereby cylindrical crosslinked portions were formed. The diameters of the cylindrical crosslinked portions that were formed by the ion irradiation are shown in Table 1 below. Obviously, the diameter of the cylindrical crosslinked portions was variable with, and hence could be controlled by, the types of the ion and the polymers.

TABLE 1

Diameters of Cylindrical Crosslinked Portions
Formed by Irradiating Two Silicon-Containing
Polymers with Two Kinds of Ion Beam

| | | Diameter (mm) of Cylindrical Crosslinked Portion | |
|---|---|---|---|
| Type of ion | LET | PCS | PCS/PVS (80/20 wt %) |
| 500 MeV $^{197}$Au$^{31+}$ | 11500 | 29.6 | 24.2 |
| 450 MeV $^{129}$Xe$^{23+}$ | 8500 | 22.4 | 19.0 |

In the next step, the uncrosslinked portions were removed by treatment with the solvent benzene and the remaining cylindrical crosslinked portions were thoroughly dried; the cylindrical crosslinked portions were then exposed to 2.4 MGy of 2 MeV electron beams in dry air so that they were crosslinked again. By subsequent firing at 1000° C. in argon gas, the cylindrical crosslinked portions were converted to SiC ceramic. Scanning probe micrographs of the ceramic nanowires obtained are shown in FIG. 3.

FIG. 3 shows by scanning probe micrographs those ceramic nanowires which were produced in accordance with the present invention by the following procedure. A thin polycarbosilane film formed at a thickness of 1000 nm as described above was irradiated with gold ions at an energy of 500 MeV to give a density of $10^9$ ions/cm$^2$, whereupon cylindrical crosslinked portions were formed. After washing with the solvent, the cylindrical crosslinked portions were crosslinked again by exposure to electron beams and, thereafter, the re-crosslinked portions were fired up to 1000° C. in argon gas so that they were converted to SiC ceramic.

By the methods of the present invention, ceramic nanowires can be produced from silicon carbide or silicon nitride with their thickness and length being controlled at desired values.

INDUSTRIAL APPLICABILITY

The silicon carbide fibers of the present invention enable uniform ceramic nanowires to be produced in a controlled quantity, thickness and length with diameters ranging from several to several tens of nanometers. The thus produced ceramic nanowires undergo only small changes in tensile strength and elastic modulus even if they are heated at 1500° C. They are also much better than carbon fibers in oxidation resistance and in addition they are extremely low in reactivity with metals. Hence, the ceramic nanowires can be used as heat- and corrosion-resistant materials, a typical example of which is a reinforcing material for use in metal-based composites.

What is claimed is:

1. A method of producing ceramic nanowires each of which has the same length and diameters ranging from several to several tens of nanometers, which method comprises:
   forming a thin film of a silicon-containing polymer usable as a ceramic precursor;
   irradiating the thin film with ion beams to form cylindrical crosslinked portions each of which has a length substantially equal to a thickness of the thin film of the ceramic precursor;
   extracting un-crosslinked portions with a solvent to form cylindrical bodies of the silicone-containing polymer;
   irradiating the cylindrical bodies of the silicone-containing polymer with an ionizing radiation to re-crosslink the cylindrical bodies of the silicone-containing polymer; and
   firing the re-crosslinked cylindrical bodies of the silicone-containing polymer in an inert gas or ammonia to form ceramic nanowires.

2. The method according to claim 1, wherein the silicon-containing polymer usable as a ceramic precursor is polycarbosilane.

3. The method according to claim 1, wherein the silicon-containing polymer usable as a ceramic precursor is a polymer blend formed by mixing two or more silicon-containing polymers.

4. The method according to claim 3, wherein the silicon-containing polymer usable as a ceramic precursor is a polymer blend formed by mixing polycarbosilane and polyvinylsilane.

5. The method according to claim 3, wherein a diameter of the ceramic nanowires is controlled by changing a mixing ratio of the polymer blend.

6. The method according to claim 1, wherein a diameter of the ceramic nanowires is controlled by changing a molecular weight of the silicon-containing polymer usable as a ceramic precursor.

7. The method according to claim 1, wherein a diameter of the ceramic nanowires is controlled by changing a deposited energy when the silicon-containing polymer usable as a ceramic precursor.

8. The method according to claim 7, wherein the silicon-containing polymer usable as a ceramic precursor is a polymer blend formed by mixing two or more silicon-containing polymers.

9. The method according to claim 1, wherein a length of the ceramic nanowires is controlled by changing a thickness of a thin film formed from the silicon-containing polymer usable as a ceramic precursor.

10. The method according to claim 9, wherein the silicon-containing polymer usable as a ceramic precursor is a polymer blend formed by mixing two or more silicon-containing polymers.

11. The method according to claim 1, wherein the firing is carried out in an ammonia gas and silicon nitride ceramic nanowires are produced.

12. The method according to claim 1, wherein the firing is carried out in an inert gas and silicon carbide ceramic nanowires are produced.

13. The method according to claim 1, wherein the ionizing radiation used in the irradiating of the cylindrical bodies of the silicone-containing polymer to re-crosslink cylindrical bodies of the silicone-containing polymer is a gamma radiation.

* * * * *

UNITED STATES PATENT AND TRADEMARK OFFICE
CERTIFICATE OF CORRECTION

| | | |
|---|---|---|
| PATENT NO. | : 7,731,927 B2 | Page 1 of 1 |
| APPLICATION NO. | : 11/520677 | |
| DATED | : June 8, 2010 | |
| INVENTOR(S) | : Masaki Sugimoto et al. | |

It is certified that error appears in the above-identified patent and that said Letters Patent is hereby corrected as shown below:

Title Pg, Item (56) (Other Publications), Line 13 delete "62-SiC" and insert -- "β-SiC --.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,731,927 B2 | Page 1 of 1 |
| APPLICATION NO. | : 11/520677 | |
| DATED | : June 8, 2010 | |
| INVENTOR(S) | : Masaki Sugimoto et al. | |

It is certified that error appears in the above-identified patent and that said Letters Patent is hereby corrected as shown below:

On the Title Page, please change the Assignee information as follows:

Item (73) Assignee: Please delete "Japan Atomic Energy Research Institute" and insert -- Japan Atomic Energy Agency --

Signed and Sealed this
Fourteenth Day of April, 2015

Michelle K. Lee
*Director of the United States Patent and Trademark Office*